(12) United States Patent
Buchok et al.

(10) Patent No.: US 9,309,994 B2
(45) Date of Patent: Apr. 12, 2016

(54) DIELECTRIC FITTING MOUNTING DEVICE

(71) Applicant: Parker-Hannifin Corporation, Cleveland, OH (US)

(72) Inventors: Aaron Joseph Buchok, Mansfield, TX (US); Andrew Eric Mau, Longmeadow, MA (US)

(73) Assignee: Parker-Hannifin Corporation, Cleveland, OH (US)

( * ) Notice: Subject to any disclaimer, the term of this patent is extended or adjusted under 35 U.S.C. 154(b) by 122 days.

(21) Appl. No.: 14/090,340

(22) Filed: Nov. 26, 2013

(65) Prior Publication Data

US 2014/0145041 A1    May 29, 2014

Related U.S. Application Data

(60) Provisional application No. 61/729,869, filed on Nov. 26, 2012.

(51) Int. Cl.
  *H05F 3/00* (2006.01)
  *F16L 5/02* (2006.01)
  *F16L 25/02* (2006.01)
  *F16B 11/00* (2006.01)

(52) U.S. Cl.
  CPC .............. *F16L 5/02* (2013.01); *F16B 11/006* (2013.01); *F16L 25/02* (2013.01)

(58) Field of Classification Search
  USPC .............. 248/56, 65, 73, 205.3; 361/215, 216
  See application file for complete search history.

(56) References Cited

U.S. PATENT DOCUMENTS

| | | | |
|---|---|---|---|
| 4,654,747 A * | 3/1987 | Covey | F16L 25/03 361/215 |
| 5,900,312 A | 5/1999 | Sylvester | |
| 6,545,853 B1 * | 4/2003 | Gelderloos | B64G 1/546 361/212 |
| 6,822,539 B2 | 11/2004 | Saito et al. | |
| 8,003,014 B2 | 8/2011 | Breay et al. | |
| 8,062,912 B2 | 11/2011 | Wang et al. | |
| 8,602,764 B2 * | 12/2013 | Hutter | B29C 33/00 248/205.3 |
| 2006/0099843 A1 | 5/2006 | Fullner et al. | |
| 2007/0145190 A1 * | 6/2007 | Villegas | B64D 37/32 244/135 R |
| 2009/0071676 A1 * | 3/2009 | Fernandez Vieira | B64D 37/32 174/30 |
| 2010/0003840 A1 | 1/2010 | Breay et al. | |
| 2012/0057267 A1 * | 3/2012 | Petit | F16L 25/025 361/215 |
| 2012/0159892 A1 * | 6/2012 | Summons | |

FOREIGN PATENT DOCUMENTS

WO  WO2011/089353  7/2011

* cited by examiner

*Primary Examiner* — Steven Marsh
(74) *Attorney, Agent, or Firm* — Renner, Otto, Boisselle & Sklar, LLP

(57) ABSTRACT

A dielectric fitting assembly for mounting on a support includes a mounting bracket including an hollow body defining a central cavity therein and extending along a longitudinal axis; and a tubular component received within the cavity, wherein the hollow body includes an internal wall surface defining a gap between the hollow body and the tubular component, wherein the bracket includes at least one port along the hollow body, fluidly connecting with the gap, and through which adhesive can be directed into the gap between the bracket and tubular component for fixing the component to the bracket.

17 Claims, 14 Drawing Sheets

DIELECTRIC FITTING MOUNTING DEVICE

RELATED APPLICATIONS

This application claims the benefit of U.S. Provisional Application No. 61/729,869 filed Nov. 26, 2012, which is hereby incorporated herein by reference.

FIELD OF INVENTION

The present invention relates generally to mounting a dielectric fitting to a support, and more particularly to a mounting bracket for adhesively mounting a dielectric fitting to a support.

BACKGROUND

Dielectric fittings, also referred to as static dissipative hydraulic isolator fittings, have found use in many applications, ranging from natural gas pipelines, where they isolate monitoring instruments from the effects of electrical current and interrupt cathodic current flow while permitting fluid flow, to providing a conduit for transferring liquid through an aircraft bulkhead. In the latter usage, the dielectric fittings contain integral fitting connections on both sides of the aircraft bulkhead that permit connections of tubes, hoses, or other fluid-carrying components. Such a dielectric fitting also provides a high electrical resistance path that limits electrical current flow between the two fitting connections but allows for the gradual dissipation of static charge.

Thus, the primary function of a dielectric fitting is to dissipate the electrical energy from static charges caused in part by fluid movements and the indirect effects of lightning, at such an occurrence. These fittings have the equally important secondary function of providing a safe fluid passage for the fluid passing through the fuel tank or other areas of the aircraft.

Conventional techniques for mounting dielectric fittings may include a mounting device or bracket comprising an hollow body circumscribing a central cavity, and an annular flange at one end projecting radially outward, and including one or more apertures for receiving a fastener and enabling the mounting device to be easily mounted to an appropriate support. The tubular component(s) of the fitting are received within the hollow body of the device, and fixed therein.

SUMMARY OF INVENTION

However, conventional bracket techniques have associated drawbacks. Therefore, provided is a method and device for adhesively bonding a bracket to a fitting. However, adhesive bonding may result in an uneven distribution of adhesive between the device and tubular component(s), and the relatively low shear strength (resistance to being pulled apart) of the assembly. Further, the adhesive can leak out the ends of the device and cover an assembler's hands, drip onto other components, or otherwise create a mess.

Therefore, exemplary mounts and mounting techniques address some of these drawbacks. In particular, exemplary techniques provide for an even distribution of adhesive between the mounting device and tubular component(s); direct the adhesive into a predetermined location along the length of the connection to reduce the leakage of the adhesive out of the connection during assembly and reduce the possibility of mess; and increase the shear strength of the fitting due to the geometry along the inside surface of an exemplary bracket.

Exemplary mounting devices may include an hollow body of the device having at least one radial aperture, to allow the injection of adhesive directly into the central area of the body, rather than at one end. Exemplary mounting devices may include a geometry formed along the inside surface of the hollow body of the device, which can comprise a circumferential, helical or spiral groove or channel, fluidly connected to the at least one aperture, and which allows the adhesive to be distributed evenly between the device and tubular component(s) within a predetermined central location along the device. The geometry formed in the surface also provides a "key" or gripping area for the adhesive, which increases the shear strength of the connection. The groove can have a smooth, curved configuration, or could have a more distinct keyway, bulbous geometry, or other formed geometry in cross-section to increase the shear strength.

Therefore, according to one aspect of the invention, a dielectric fitting assembly for mounting on a support includes a mounting bracket including an hollow body defining a central cavity therein and extending along a longitudinal axis; and a tubular component received within the cavity, wherein the hollow body includes an internal wall surface defining a gap between the hollow body and the tubular component, wherein the bracket includes at least one port along the hollow body, fluidly connecting with the gap, and through which adhesive can be directed into the gap between the bracket and tubular component for fixing the component to the bracket.

Optionally, the dielectric fitting assembly includes adhesive disposed within the gap and securing the tubular component to the bracket.

Optionally, a mounting flange with seals, is provided at one end of the bracket and extends radially outward from the end of the bracket.

Optionally, the hollow body has a channel provided at the internal wall surface fluidly connected to the port.

Optionally, the channel includes an annular channel circumscribing the internal wall surface of the bracket.

Optionally, the channel includes a helical or spiral form.

Optionally, the channel is non-uniform in cross-section.

Optionally, the channel is slotted.

Optionally, the channel is bulbous.

Optionally, the channel extends from the at least one port.

Optionally, the channel extends axially along the hollow body.

Optionally, the at least one port extends radially through the hollow body.

Optionally, the at least one port includes two ports circumferentially offset from each other.

Optionally, the port is a frustoconical port.

Optionally, the port has either a slot or bulbous portion generally centrally located along the length of the port.

Optionally, the dielectric fitting assembly includes an annular seal at an end of the bracket for containing adhesive and isolating the adhesive from environmental contaminants.

Optionally, the seal is conductive.

Optionally, ends of the hollow body include an interior chamfer.

According to another aspect of the invention, a method of assembling a dielectric fitting assembly for mounting on a support, the fitting including a mounting bracket including an hollow body defining a central cavity therein and extending along a longitudinal axis and a tubular component received within the cavity, the hollow body includes an internal wall surface defining a gap between the hollow body and the tubular component, and the bracket includes at least one port along the hollow body, fluidly connecting with the gap, and through which adhesive can be directed into the gap between the bracket and tubular component for fixing the component to the bracket, the method includes the steps of: wiping the surfaces to be bonded with acetone; and applying adhesive to the surfaces to be bonded without further surface preparation.

Optionally, the method also includes inserting the tubular component into the hollow body, and applying the adhesive includes pumping adhesive through the port after the inserting and the wiping.

The foregoing and other features of the invention are hereinafter described in greater detail with reference to the accompanying drawings.

DETAILED DESCRIPTION

Figure 1:
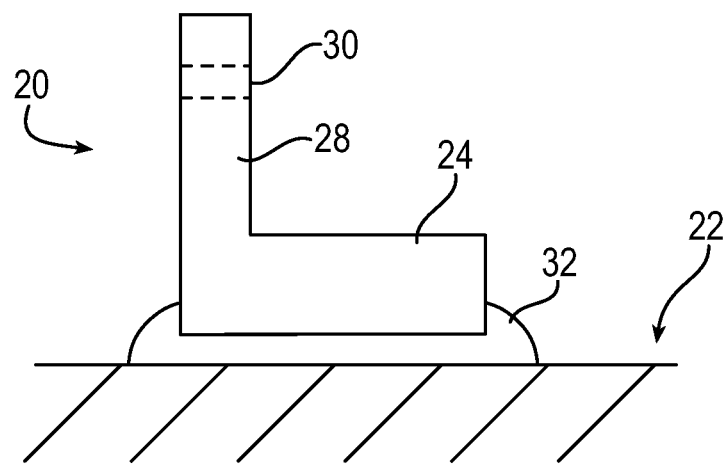
FIG. 1 shows a partial cross-section of a dielectric fitting adhesively bonded to a mounting bracket.
Figure 2:
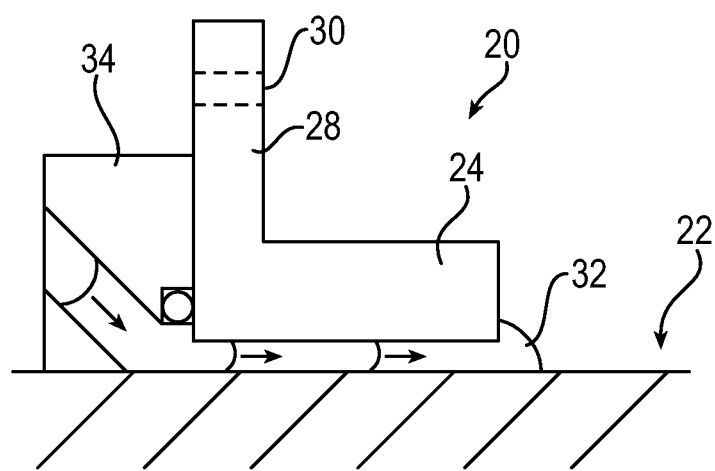
FIG. 2 shows a partial cross-section of adhesive being pumped into an end opening of a gap between a dielectric fitting and a mounting bracket.
Figure 3:
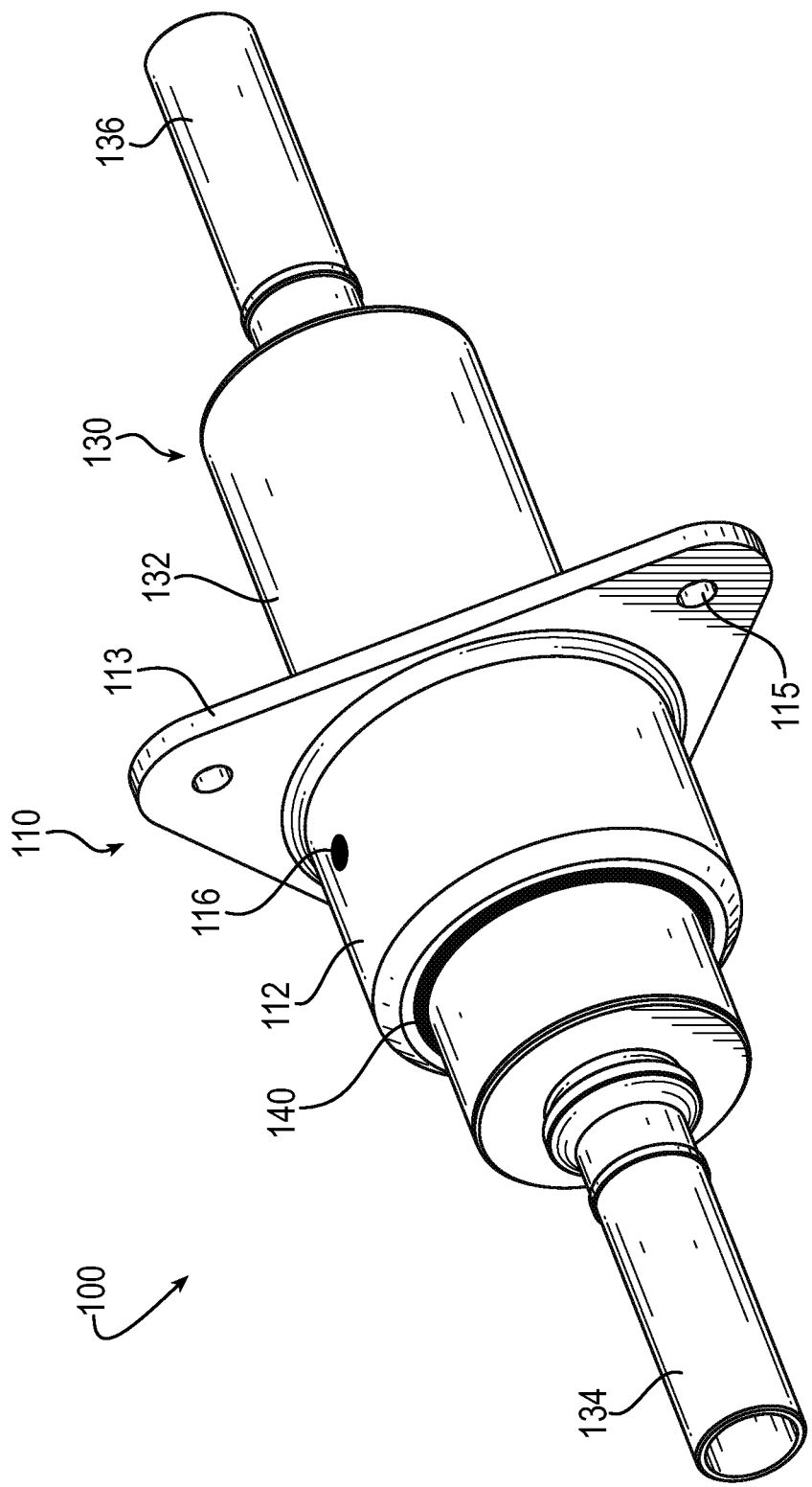
FIG. 3 shows a perspective view of an exemplary dielectric fitting assembly.
Figure 4:
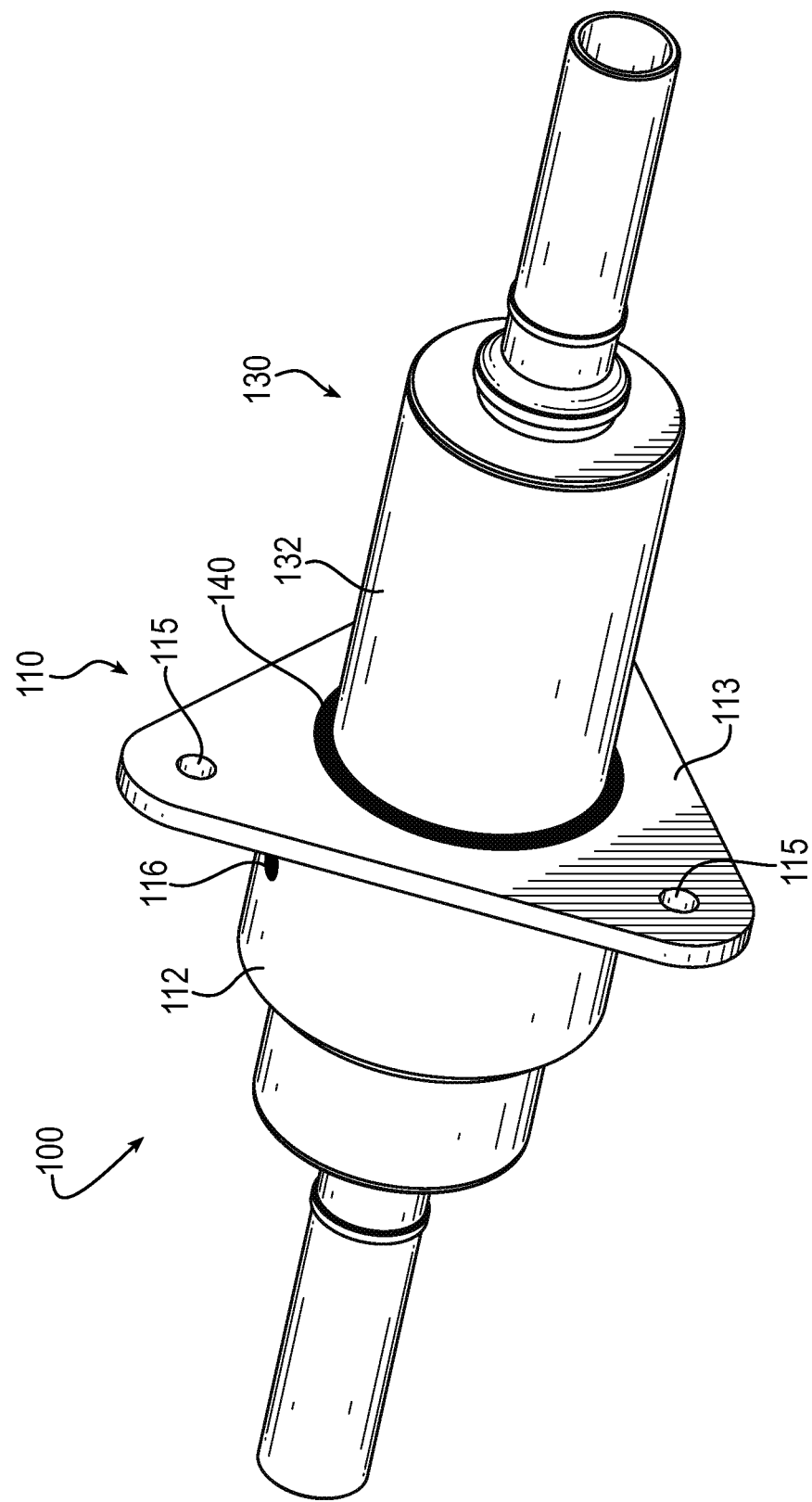
FIG. 4 shows another perspective view of an exemplary dielectric fitting assembly.
Figure 5:
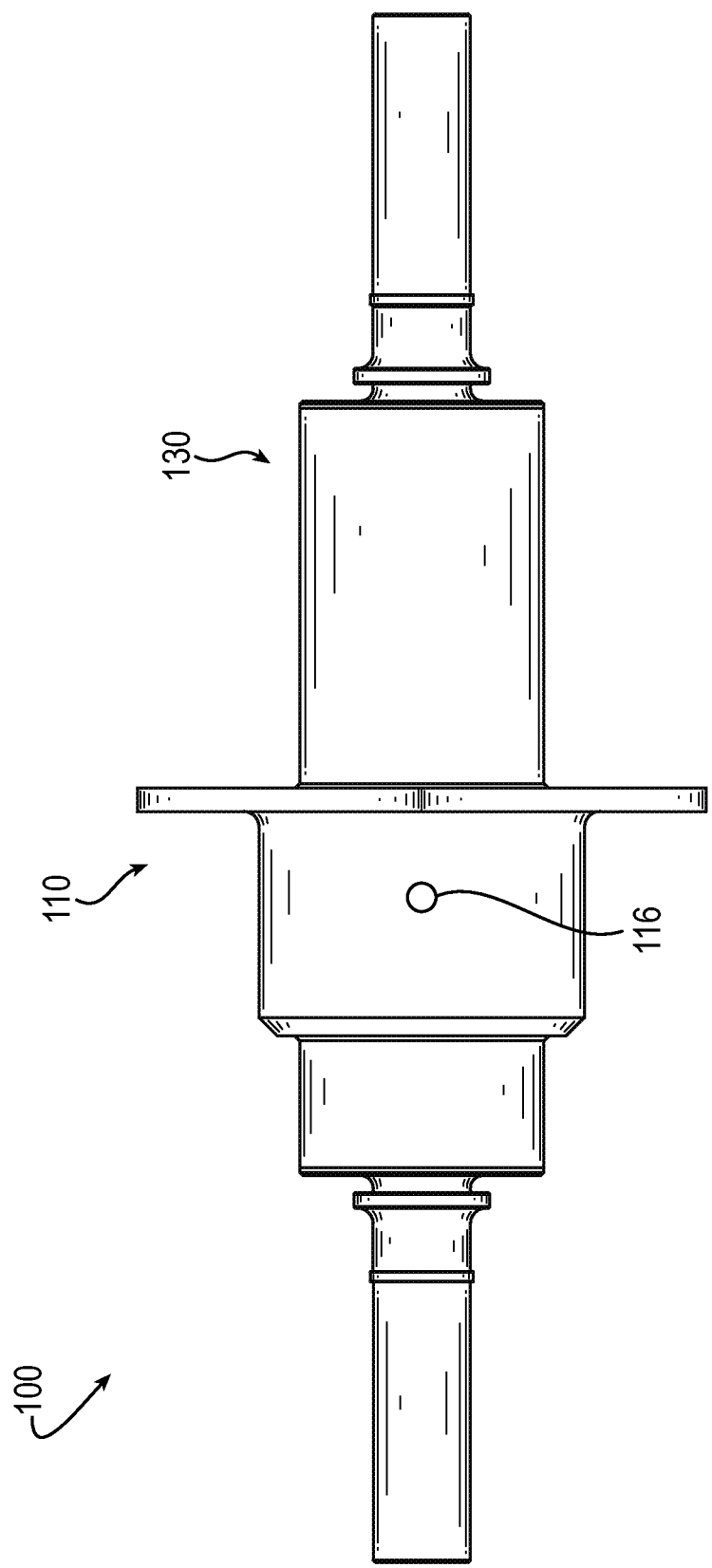
FIG. 5 shows a top view of an exemplary dielectric fitting assembly.
Figure 6:
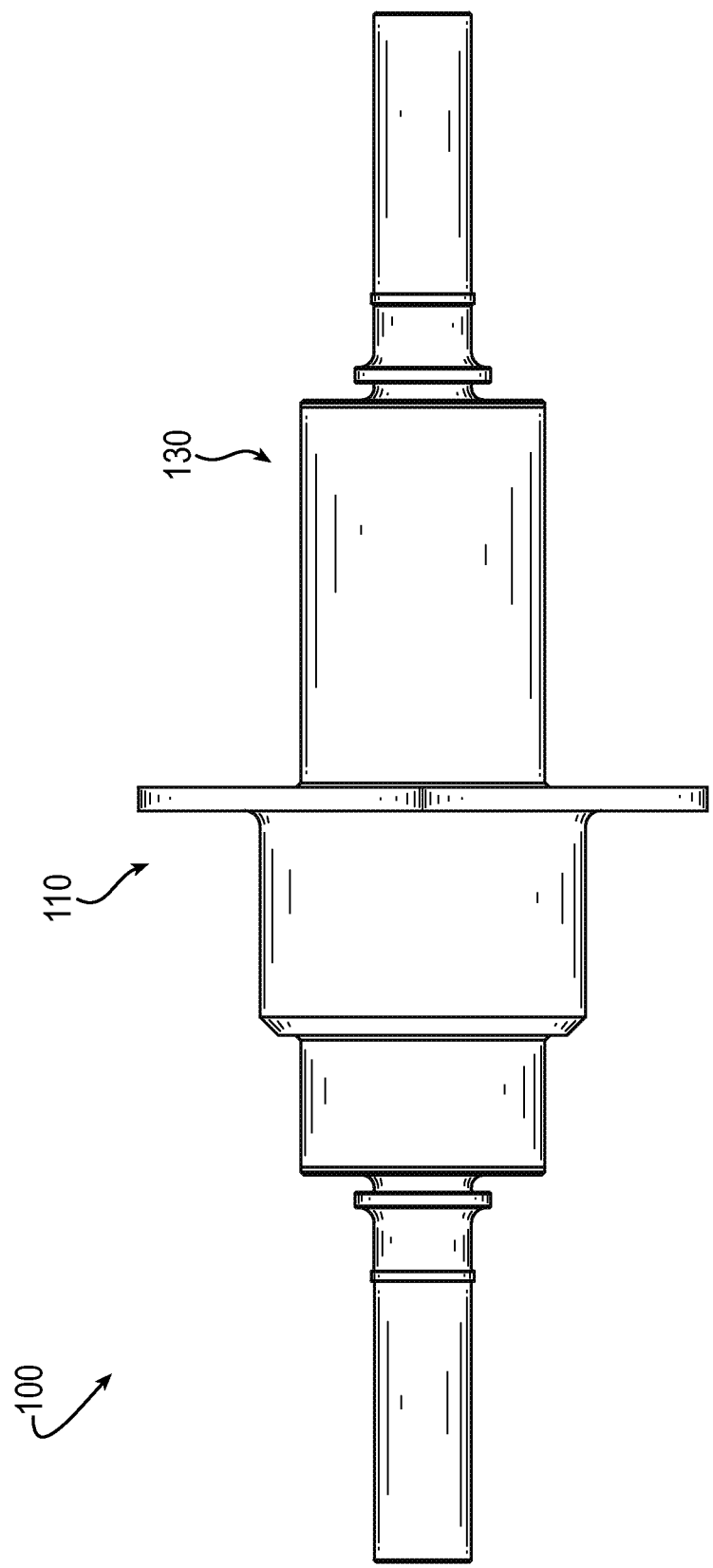
FIG. 6 shows a bottom view of an exemplary dielectric fitting assembly.
Figure 7:
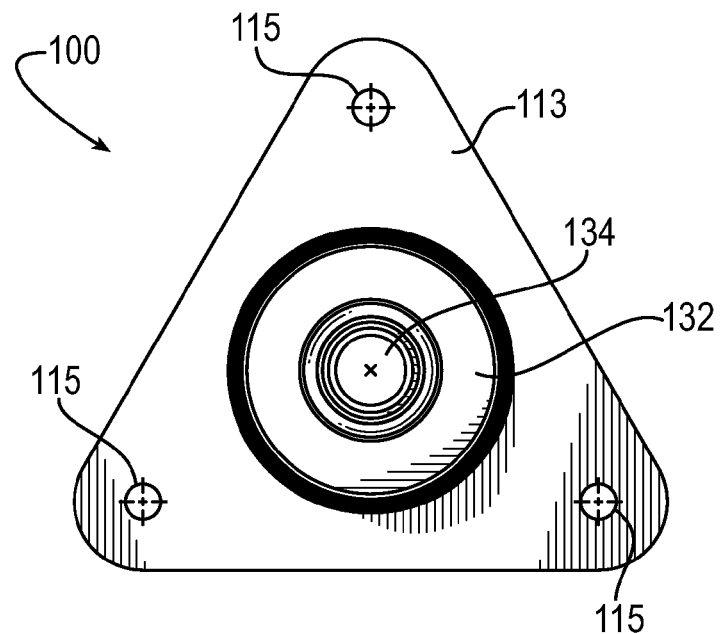
FIG. 7 shows a back view of an exemplary dielectric fitting assembly.
Figure 8:
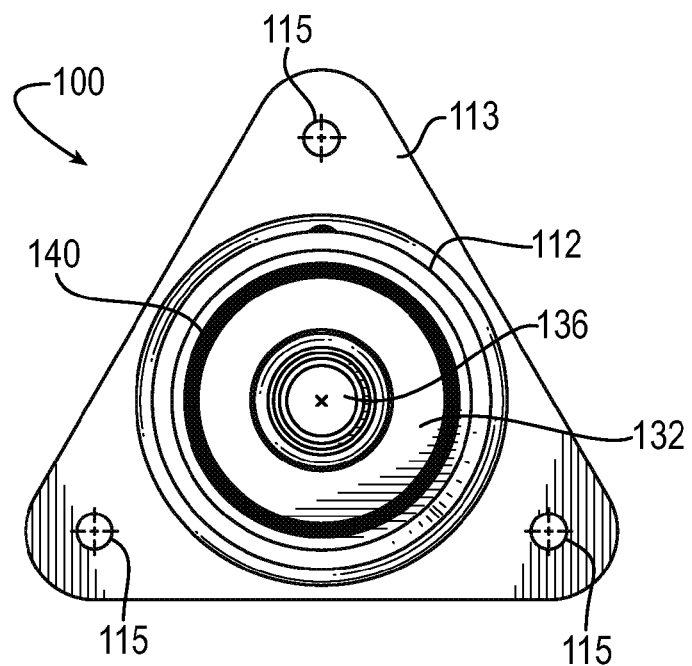
FIG. 8 shows a front view of an exemplary dielectric fitting assembly.

Referring to the drawings, and initially to FIGS. 1 and 2, a mounting device or bracket is indicated generally at 20, and a conventional fitting is indicated generally at 22. Fitting 22 can include one or more tubular components, as is generally known in the industry. Although the fitting is often circular in cross-section, other tubular shapes are contemplated, including, for example, square or rectangular cross-sectioned fittings. The bracket 20 includes a hollow body 24 (having a cross-sectional shape generally corresponding to the fitting used therein—in this case circular, forming an annular body) and an integral flange 28, projecting radially/laterally outwardly from one end of the body. Flange 28 conventionally has one or more apertures 30 formed therethrough, for enabling the device to be mounted to an appropriate support in a system. In order to fix the body 24 to the fitting, adhesive 32 may be injected from one end of the bracket into the gap between the outer diameter of the fitting and the inner diameter of the hollow body, for example, as shown using a tool 34, in FIG. 2. The adhesive spreads between the components, and can create a fillet at one or both ends and may trap air between the bracket and the fitting.

Herein, dielectric fittings are illustrated as a bulkhead-type fitting because fittings are often designed to extend through a bulkhead of a vessel, such as an aircraft, with the bulkhead including an air side or outer side and a fuel side or inner side. It should be understood that dielectric fittings can be used in a many other applications, such as gas to gas, liquid to liquid, gas/liquid to gas/liquid, or the like.

Referring now to the exemplary fitting assembly 100 in FIGS. 3-8 and 16, the mounting bracket 110 (shown individually in FIGS. 9-15) includes a hollow body 112 which is illustrated circumscribing a central cavity 114, which closely receives fitting 130 and a radially outwardly extending flange 113. Again, although illustrated as tubular, the hollow body may be of any appropriate shape, depending on the application.

Although shown as an integral, triangular shape, the flange may also be a separate piece rigidly coupled to the body and may have other profiles, for example circular. The flange may have one or more apertures 115 for mounting the bracket to, for example, a bulkhead.

Fitting 130 is illustrated as having main tubular component 132, to which additional tubular components 134, 136 can be attached (depending upon the application). Again, although depicted as having a circular cross-section, exemplary fittings may also include square, rectangular, and other cross-sections all of which are herein encompassed by the general "tubular" nomenclature.

An aperture or port 116 is shown formed radially through the hollow body portion of the bracket. The aperture 116 allows trapped air to exit the gap between the components when the adhesive is being applied. The aperture can be formed along the length of the body, at a location to direct adhesive into the central area between the bracket and fitting. Although in exemplary embodiments the aperture is located directly half way between the ends of the bracket, other locations are possible. The aperture may be particularly positioned by one having skill in the art to allow the adhesive to spread somewhat evenly between the components and when cured, provide a strong and robust attachment of the bracket to the fitting.

Figure 9:
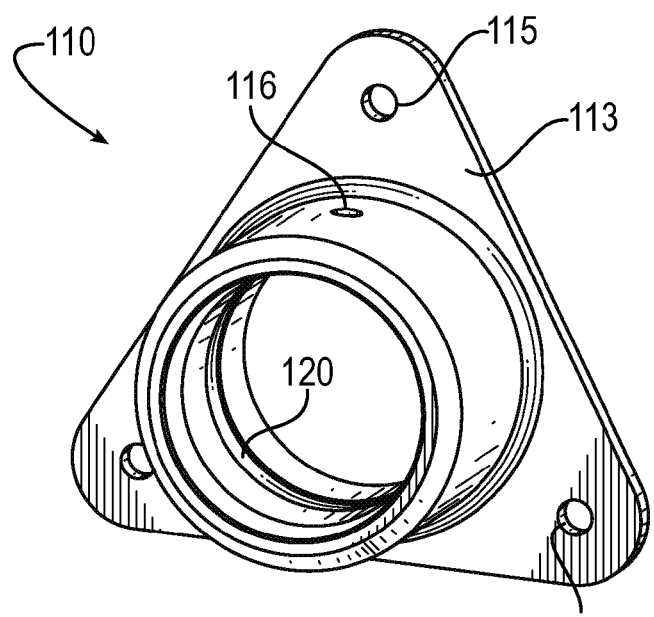
FIG. 9 shows a perspective view of an exemplary mounting bracket for a dielectric fitting assembly.
Figure 10:
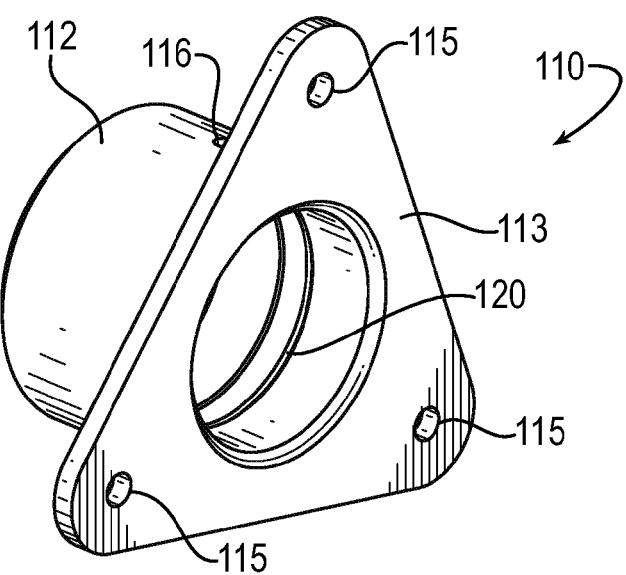
FIG. 10 shows another perspective view of an exemplary mounting bracket for a dielectric fitting assembly.
Figure 11:
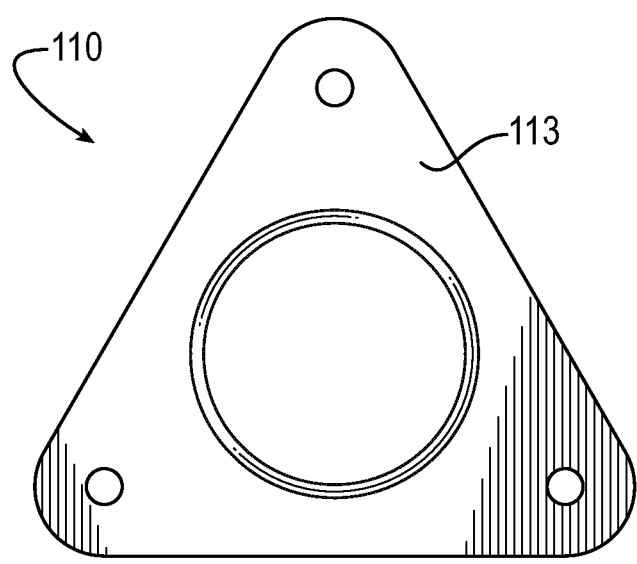
FIG. 11 shows a back view of an exemplary mounting bracket for a dielectric fitting assembly.
Figure 12:
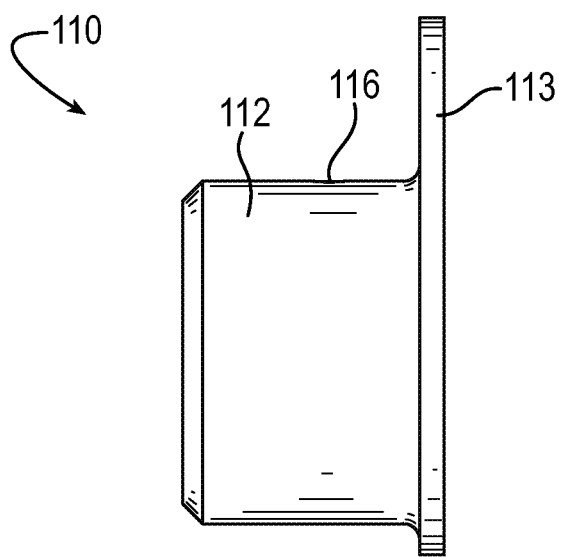
FIG. 12 shows a side view of an exemplary mounting bracket for a dielectric fitting assembly.
Figure 13:
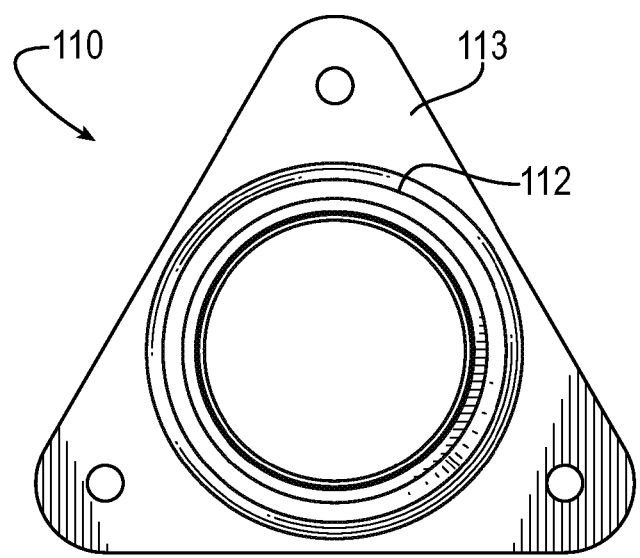
FIG. 13 shows a front perspective view of an exemplary mounting bracket for a dielectric fitting assembly.
Figure 14:
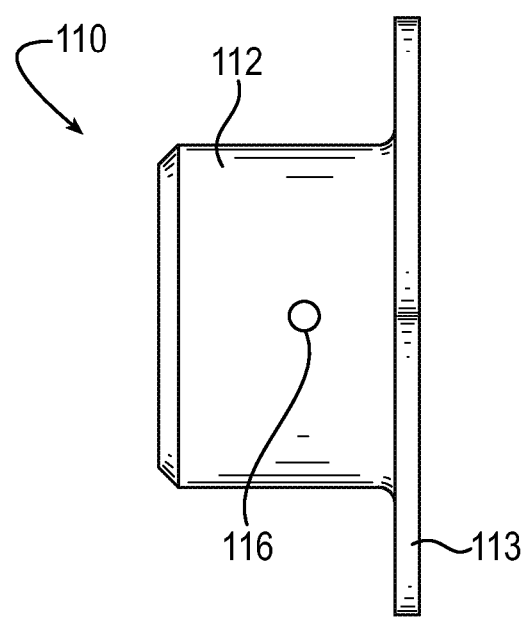
FIG. 14 shows a top view of an exemplary mounting bracket for a dielectric fitting assembly.
Figure 15:
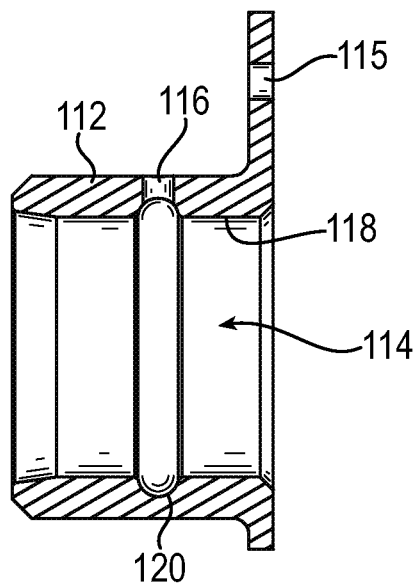
FIG. 15 shows a side cross-sectional view of an exemplary mounting bracket for a dielectric fitting assembly.

As shown particularly in FIGS. 9-10 and 15, the inside surface 118 of the hollow body 112 can include a geometry, such as an annular channel 120, which extends from and is therefore fluidly connected to the aperture 116, and directs the adhesive 140 into a predefined area between the bracket and the fitting. The channel can be continuous and circumscribe the entire inside surface of the hollow body, although it could also extend around only a portion of the inside surface. Also, while a single annular channel is shown extending in a plane transverse to the longitudinal axis of the hollow body; such channel could alternatively comprise a helical or spiral groove or channel, or may include one or more intersecting or non-intersecting grooves or channels of same or different lengths.

Figure 17:
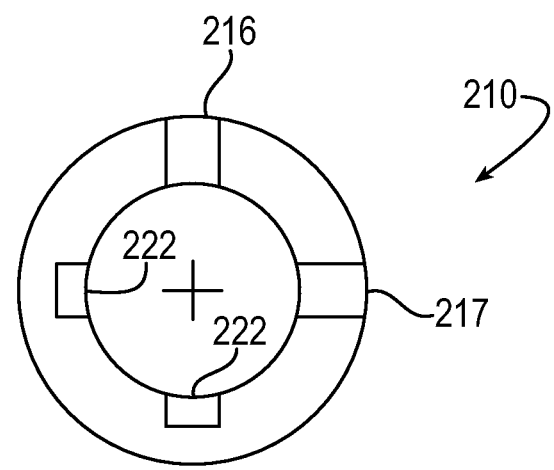
FIG. 17 shows a transverse cross-section of another exemplary mounting bracket showing circumferentially offset ports and circumferentially offset axial channels opposite the ports.
Figure 16:
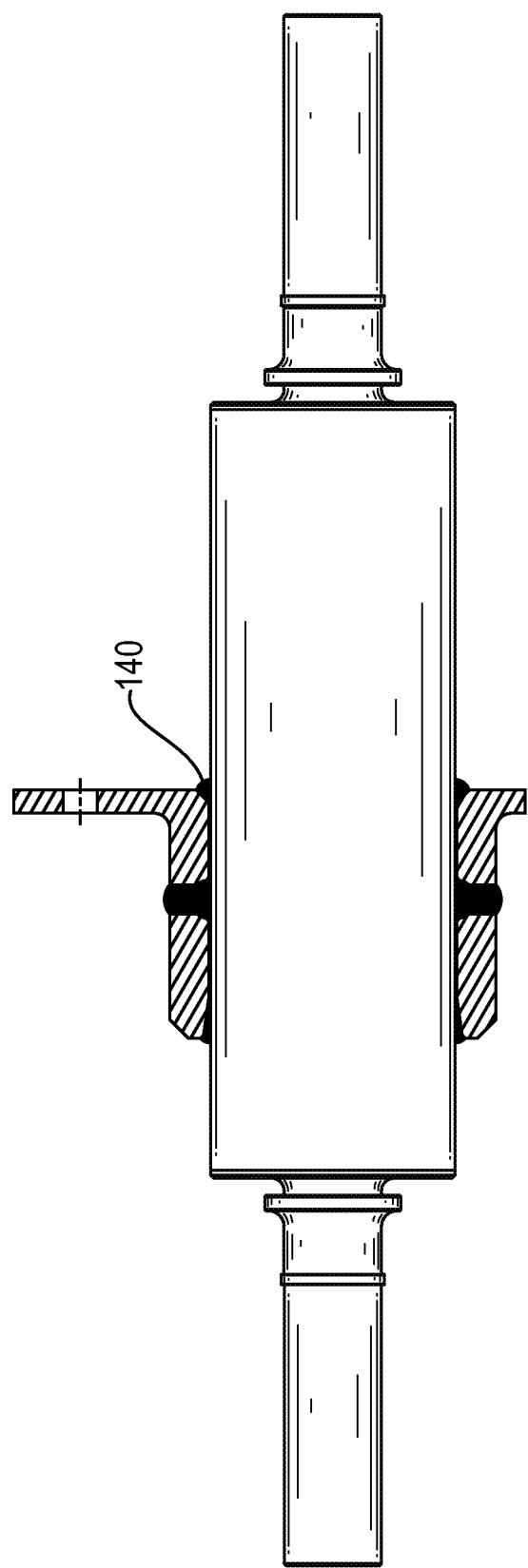
FIG. 16 shows a side view of an exemplary dielectric fitting assembly with the mounting bracket having two visible ports circumferentially opposite each other, the bracket shown in cross-section, making visible the applied adhesive disposed in the gap between the bracket and the dielectric fitting.

Turning now to FIG. 17, a cross-section of an exemplary embodiment of the bracket is shown at 210. The bracket 210 is substantially the same as the above-referenced bracket 110, and consequently the same reference numerals but indexed by 100 are used to denote structures corresponding to similar structures in the bracket. In addition, the foregoing description of the bracket 110 is equally applicable to the bracket 210 except as noted below. Moreover, it will be appreciated upon reading and understanding the specification that aspects of the brackets may be substituted for one another or used in conjunction with one another where applicable. In particular, bracket 210 may include one or more additional radial ports/apertures 217 into the channel (or into more than one channel, not shown). Although such ports may be spaced axially along the length of the hollow body, preferably the ports are circumferentially spaced/offset so as to minimize trapped air from adhesive application. It is noted that the term "circumferentially" is used to denote a spacing along a direction perpendicular to the longitudinal axis regardless of the cross-sectional shape of the bracket. Therefore, in applications having square or rectangular cross-sections, ports may be positioned on oppositely-facing surfaces, for example. If additional apertures are used, a stepwise or sequential adhesive application would best prevent air pockets from developing. Additionally or alternatively, the bracket 210 may include axially extending channel(s) as at 222 interconnecting with the aperture(s) 216, 217 and/or the channel (not visible).

Figure 18A:
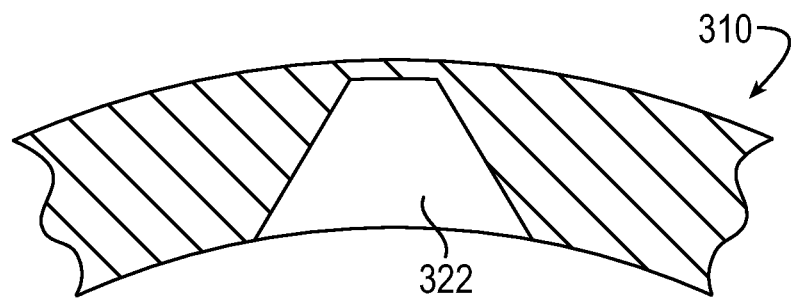
FIG. 18A shows a partial cross-section of another exemplary mounting bracket having a wedge-shaped axial channel.
Figure 18B:
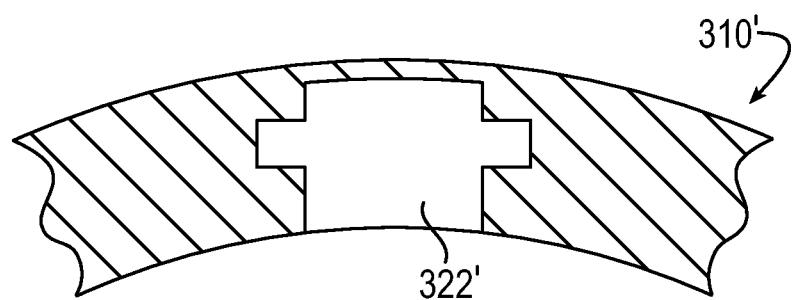
FIG. 18B shows a partial cross-section of another exemplary mounting bracket having a slotted axial channel.
Figure 18C:
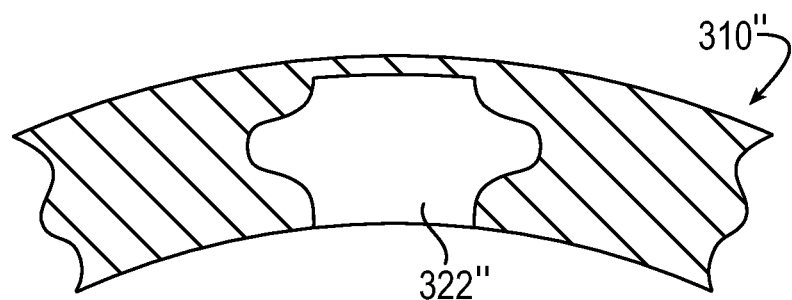
FIG. 18C shows a partial cross-section of another exemplary mounting bracket having a bulbous axial channel.

Turning now to FIGS. 18A-18C, partial cross-sections of exemplary embodiments of the bracket are shown at 310, 310' and 310". The brackets 310, 310' and 310" are substantially the same as the above-referenced brackets 110 and 210, and consequently the same reference numerals but indexed by 100 are used to denote structures corresponding to similar structures in the brackets. In addition, the foregoing description of the brackets 110 and 210 are equally applicable to the brackets 310, 310' and 310" except as noted below. Moreover, it will be appreciated upon reading and understanding the specification that aspects of the brackets may be substituted for one another or used in conjunction with one another where applicable. In particular, brackets 310, 310' and 310" may include channels (axial or circumferential, depicted as axial for clarity) or apertures (not shown) with other than a smooth, curved cross-sectional form, such as a wedge shape (FIG. 18A) channel 322, slotted (FIG. 18B) channel 322', bulbous (FIG. 18C) channel 322" or other non-uniform shape. Examples of aperture shapes corresponding to the depicted channel shapes include a frustoconical port and a port having either a slot or bulbous portion generally centrally located along the length of the port (i.e. in the radial direction of the hollow body).

In addition, although not depicted, multiple circumferential channels could be formed along the length of an exemplary bracket, either connected to additional radial aperture(s), or to another circumferential channel through an axial channel or channels.

Such channel(s) create a "key in slot" in the annular gap along the length of the fitting and bracket connection area, which improves the shear force of the assembly.

Figure 19:
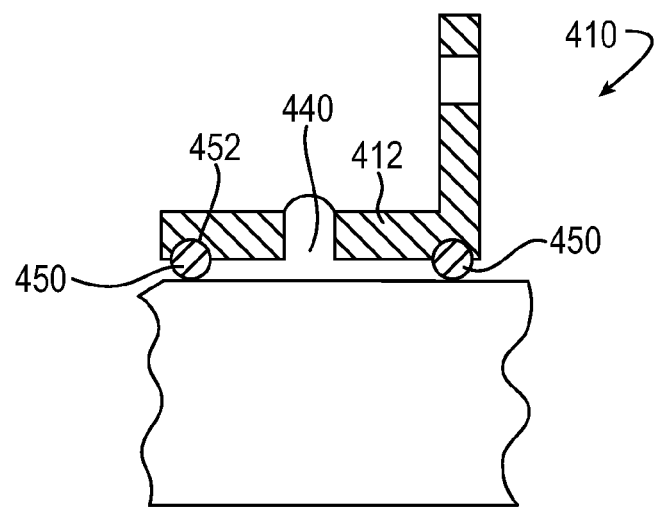
FIG. 19 shows a partial cross-section of another exemplary dielectric fitting assembly with a mounting bracket having o-ring seals at opposite ends.
Figure 20:
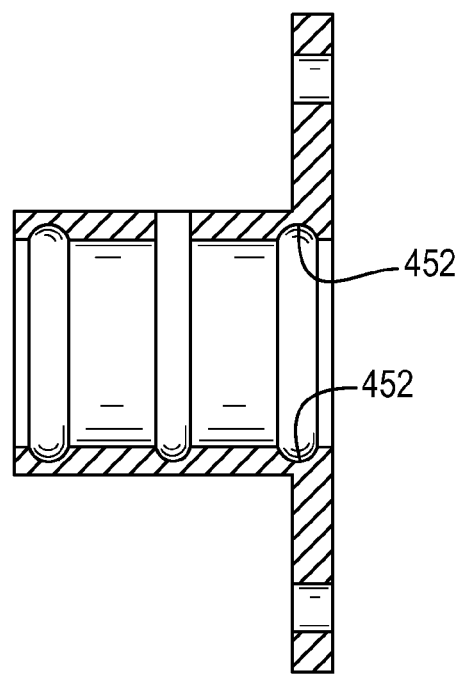
FIG. 20 shows a cross-section of another exemplary mounting bracket having end channels for receiving seals.
Figure 21:
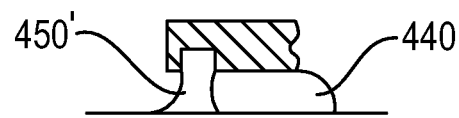
FIG. 21 shows a partial cross-section of another exemplary dielectric fitting assembly with a mounting bracket having a wiper-type seal.

Turning now to FIGS. 19-21, partial cross-sections of an exemplary fitting assembly is shown at 400 and an exemplary bracket at 410. The assembly 400 and bracket 410 are substantially the same as the above-referenced assembly 100 and brackets 110, 210, 310, 310' and 310", and consequently the same reference numerals but indexed by 100 are used to denote structures corresponding to similar structures in the bracket. In addition, the foregoing description of the brackets are equally applicable to the bracket 410 except as noted below. Moreover, it will be appreciated upon reading and understanding the specification that aspects of the brackets may be substituted for one another or used in conjunction with one another where applicable. In particular, one or more seals 450 can be located in annular seal grooves 452, along the length of the hollow body 412, thereby creating a liquid tight barrier between an area exterior to the fitting assembly and the adhesive layer. Seals can be an O-ring, for example (FIG. 19), or have other configurations such as a wiper (FIG. 21) 450'. Seal grooves 452 can be formed near the opposite ends of the bracket for holding the seals. The seals may prevent the adhesive from flowing out beyond the central region of the connection. Further, the seals may prevent fluid external to the bracket (e.g., fuel) wicking into the adhesive and thereby degrading the bond. Finally, the seals may be conductive, thereby providing an optional electrical pathway between the bracket and the fitting.

Figure 22:
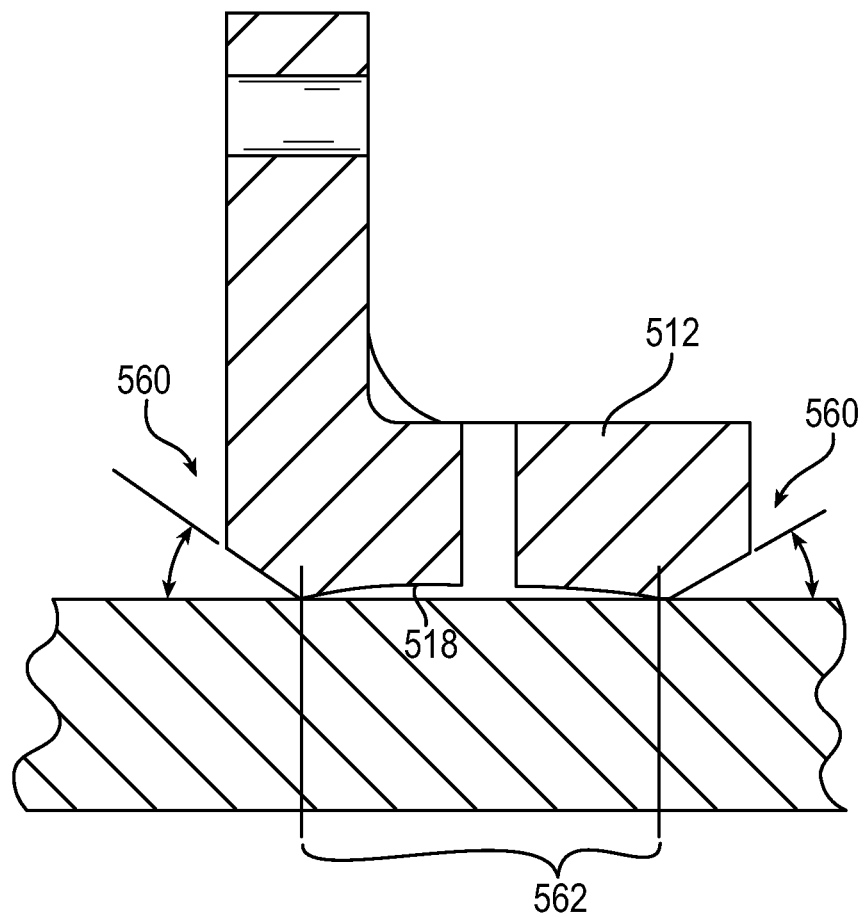
FIG. 22 shows a partial cross-sectional view of another exemplary dielectric fitting assembly having a mounting bracket with interior end chamfers and an interior concavity along its longitudinal length.

Turning now to FIG. 22, a partial cross-section of an exemplary fitting assembly is shown at 500. The assembly 500 and bracket 510 are substantially the same as the above-referenced assemblies 100, 400 and brackets 110, 210, 310, 310', 310", and 410, and consequently the same reference numerals but indexed by 100 are used to denote structures corresponding to similar structures in the bracket. In addition, the foregoing description of the brackets are equally applicable to the bracket 510 except as noted below. Moreover, it will be appreciated upon reading and understanding the specification that aspects of the brackets may be substituted for one another or used in conjunction with one another where applicable. In particular, leading edges 560 of the bracket at both axial ends can be chamfered. Such a chamfer may minimize shear edge effect. Preferably, the chamfer angle may be about 11 degrees, although other angles are possible. Further, the internal surface 518 of the hollow body 512 in central region 562 can be angled or rounded, to facilitate locating the adhesive in the central region of the bracket and fitting interface, and preventing leakage beyond the bracket.

In view of the above, exemplary mounting devices is provided where the hollow body of the device includes at least one radial aperture, to allow the injection of adhesive directly into the central area of the body, rather than at one end. The device can also include a geometry formed along the inside surface of the hollow body of the device, which can comprise a circumferential, helical or spiral groove or channel, fluidly connected to the at least one aperture, and which allows the adhesive to be distributed evenly between the device and tubular component(s) within a predetermined central location along the device. The pumping of adhesive through the aperture and along the channel provides a self-centering mechanism improving bond strength and reliability, and automatically aligning the flange to be perpendicular to the fitting. Further, the groove(s) allow rings of adhesive that aid in resolving adhesive stresses within the assembly rather than allowing stress concentrations to extend to free edges. The geometry formed in the surface also provides a "key" or gripping area for the adhesive, which increases the shear strength of the connection. The groove can have a smooth, curved configuration, or could have a more distinct keyway, bulbous geometry, or other formed geometry in cross-section to increase the shear strength.

As such, an even distribution of adhesive between the mounting device and tubular component(s) may be provided. The adhesive may be directed into a predetermined location along the length of the connection to reduce the leakage of the adhesive out of the connection during assembly and reduce the possibility of mess; and increases the shear strength of the fitting due to the geometry along the inside surface of the bracket.

The bracket and fitting may be of any suitable material, but may be preferably made of a light metal, to minimize weight, such as, for example, of titanium alloy, type 6Al-4V, as per AMS 4928. Furthermore, the titanium parts may be phosphate conversion coated, as per AMS 2486 to provide additional corrosion protection and electrical conductivity. Dielectric insulators may be any suitable material and may include, for example, a composite body consisting of continuous glass reinforcement supported by an epoxy matrix material. This may be fabricated, for example, by means of filament winding over an internal support structure. As another non-limiting example, a 30% glass fiber filled, standard flow polyetherimide (Tg 217C), ECO conforming, UL94 V0 and 5VA listing material, commercially sold and distributed by the General Electric Company under the trade name ULTEM® 2300 may also be used in the dielectric insulator. Adhesive used herein may be any suitable adhesive, for example an epoxy adhesive with a fiberglass matrix. It should be understood that while the above-noted materials are the preferred materials, depending upon specific applications, other equivalent materials may also be utilized.

Although titanium bonding typically requires high levels of surface preparation, exemplary configurations allow for a much-reduced preparation. In particular, conventional mechanical and chemical surface preparation may be eliminated. Rather, adhesive may be applied after the surfaces to be bonded are wiped with a clean rag and acetone, without further surface preparation.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A dielectric fitting assembly for mounting on a support comprising:
    a mounting bracket including a hollow body defining a central cavity therein and extending along a longitudinal axis; and
    a tubular component received within the cavity,
    wherein the hollow body includes an internal wall surface defining a gap between the hollow body and the tubular component,
    wherein the bracket includes at least one port along the hollow body, fluidly connecting with the gap, and through which adhesive can be directed into the gap between the bracket and tubular component for fixing the component to the bracket, and
    wherein the hollow body has a channel provided at the internal wall surface fluidly connected to the port.

2. The dielectric fitting assembly of claim 1, further comprising adhesive disposed within the gap and securing the tubular component to the bracket.

3. The dielectric fitting assembly as in claim 1, wherein a mounting flange with seals, is provided at one end of the bracket and extends laterally outward from the end of the bracket.

4. The dielectric fitting assembly as in claim 1, wherein the channel includes a channel circumscribing the internal wall surface of the bracket.

5. The dielectric fitting assembly as in claim 1, wherein the channel includes a helical or spiral form.

6. The dielectric fitting assembly as in claim 1, wherein the channel is non-uniform in cross-section.

7. The dielectric fitting assembly as in claim 6, wherein the channel is slotted or bulbous.

8. The dielectric fitting assembly of claim 1, wherein the channel extends from the at least one port.

9. The dielectric fitting assembly of claim 1, wherein the channel extends axially along the hollow body.

10. The dielectric fitting assembly as in claim 1, wherein the tubular component and the hollow body are circular in cross-section.

11. The dielectric fitting assembly as in claim 1, wherein the at least one port extends radially through the hollow body.

12. The dielectric fitting assembly of claim 11, wherein the at least one port includes two ports circumferentially offset from each other.

13. The dielectric fitting assembly of claim 1, wherein the port is a frustoconical port.

14. The dielectric fitting assembly of claim 1, wherein the port has either a slot or bulbous portion generally centrally located along the length of the port.

15. The dielectric fitting assembly of claim 1, further comprising an annular seal at an end of the bracket for containing adhesive and isolating the adhesive from environmental contaminants.

16. The dielectric fitting assembly of claim 15, wherein the seal is conductive.

17. The dielectric fitting assembly of claim 1, wherein ends of the hollow body include an interior chamfer.

* * * * *